United States Patent
Scheible et al.

(10) Patent No.: US 6,597,076 B2
(45) Date of Patent: Jul. 22, 2003

(54) SYSTEM FOR WIRELESSLY SUPPLYING A LARGE NUMBER OF ACTUATORS OF A MACHINE WITH ELECTRICAL POWER

(75) Inventors: Guntram Scheible, Hirschberg (DE); Bernd Smailus, Hemsbach (DE); Martin Klaus, Bensheim (DE); Kai Garrels, Mannheim (DE); Lothar Heinemann, Hirschberg (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/014,002

(22) Filed: Dec. 11, 2001

(65) Prior Publication Data

US 2002/0118004 A1 Aug. 29, 2002

Related U.S. Application Data

(63) Continuation of application No. PCT/EP00/05138, filed on Jun. 6, 2000.

(30) Foreign Application Priority Data

Jun. 11, 1999 (DE) .......................................... 199 26 562
Jun. 26, 1999 (DE) .......................................... 199 29 344

(51) Int. Cl.⁷ ................................................. H02J 5/00
(52) U.S. Cl. ........................................ 307/104; 307/155
(58) Field of Search ............................... 307/104, 149, 307/154–156

(56) References Cited

U.S. PATENT DOCUMENTS

| | | | | |
|---|---|---|---|---|
| 5,428,659 A | * | 6/1995 | Renner et al. ............... | 378/162 |
| 5,455,466 A | * | 10/1995 | Parks et al. .................. | 307/104 |
| 5,455,467 A | * | 10/1995 | Young et al. ................ | 307/104 |
| 5,804,892 A | * | 9/1998 | Schwan et al. .............. | 307/104 |
| 5,814,900 A | * | 9/1998 | Esser et al. .................. | 307/104 |
| 5,831,348 A | * | 11/1998 | Nishizawa ................... | 307/104 |
| 5,890,779 A | * | 4/1999 | Blackburn et al. .......... | 307/104 |
| 6,005,304 A | * | 12/1999 | Seelig ......................... | 307/104 |
| 6,265,791 B1 | * | 7/2001 | Eberl et al. .................. | 307/104 |
| 6,462,432 B1 | * | 10/2002 | Seelig et al. ................. | 307/104 |

FOREIGN PATENT DOCUMENTS

| | | | | |
|---|---|---|---|---|
| DE | 195 28 341 C1 | 10/1996 | | |
| DE | 197 35 624 C1 | 12/1998 | | |
| GB | 2 129 138 A | * | 5/1984 | ........... G08C/17/00 |
| JP | 10-322251 | * | 12/1998 | ............ H04B/5/02 |
| WO | WO 89/10030 | 10/1989 | | |

OTHER PUBLICATIONS

Kawamura, A. et al.: "Wireless Transmission of Power and Information through One High Frequency Resonant AC Link Inverter for Robot Manipulator Applications", IEEE, Oct. 8, 1995, pp. 2367–2372.

* cited by examiner

*Primary Examiner*—Fritz Fleming
(74) *Attorney, Agent, or Firm*—Laurence A. Greenberg; Werner H. Stemer; Ralph E. Locher

(57) ABSTRACT

A configuration for supplying a large number of actuators with electrical power without using wires includes at least one primary winding that is fed from a medium-frequency oscillator. Each actuator has at least one secondary winding that is suitable for drawing power from a medium-frequency magnetic field.

23 Claims, 6 Drawing Sheets

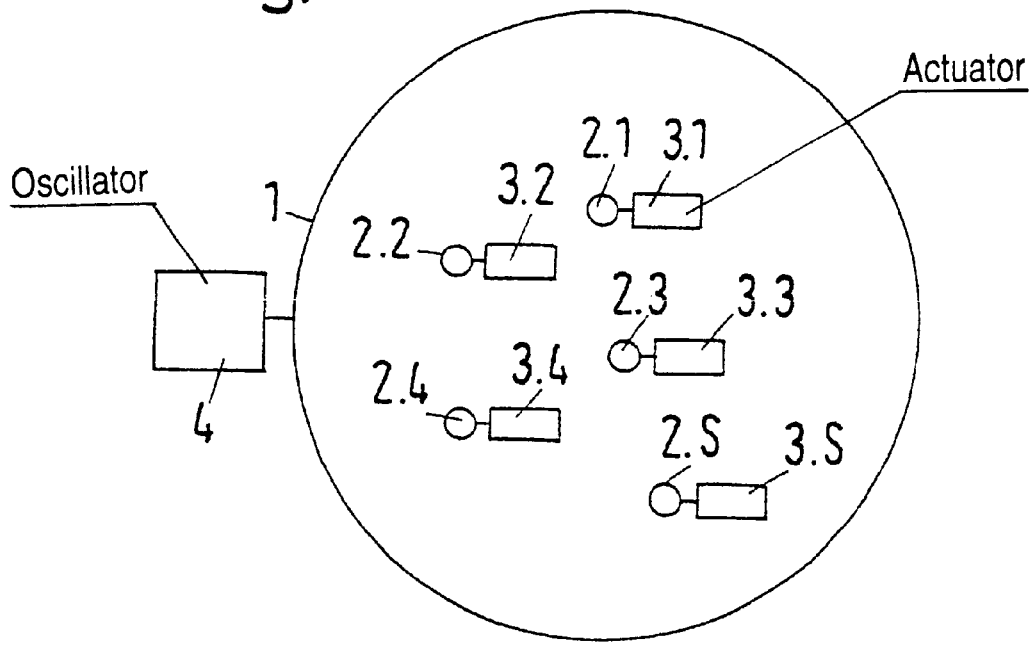
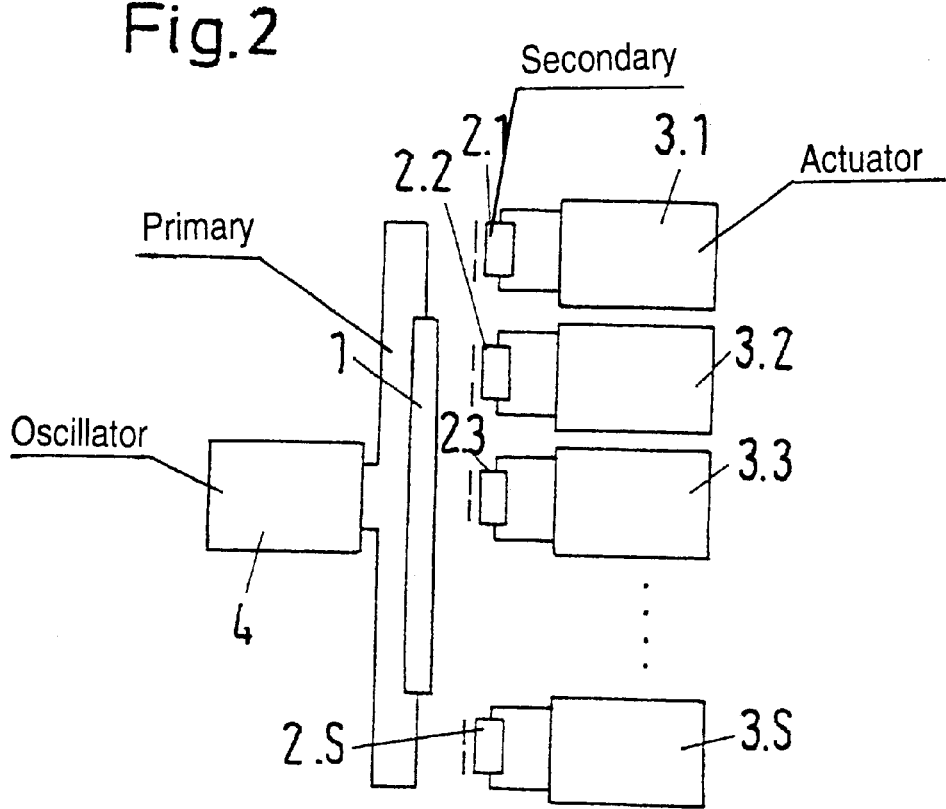

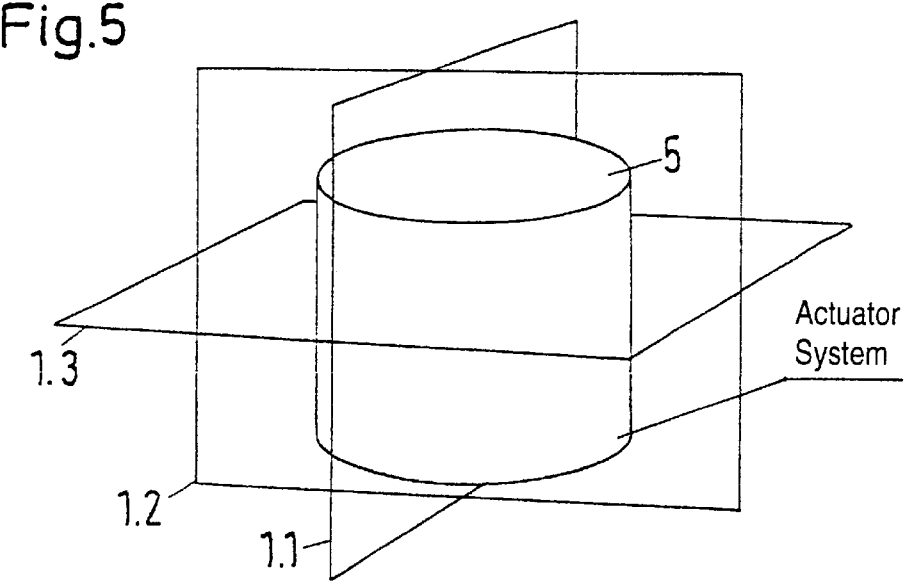
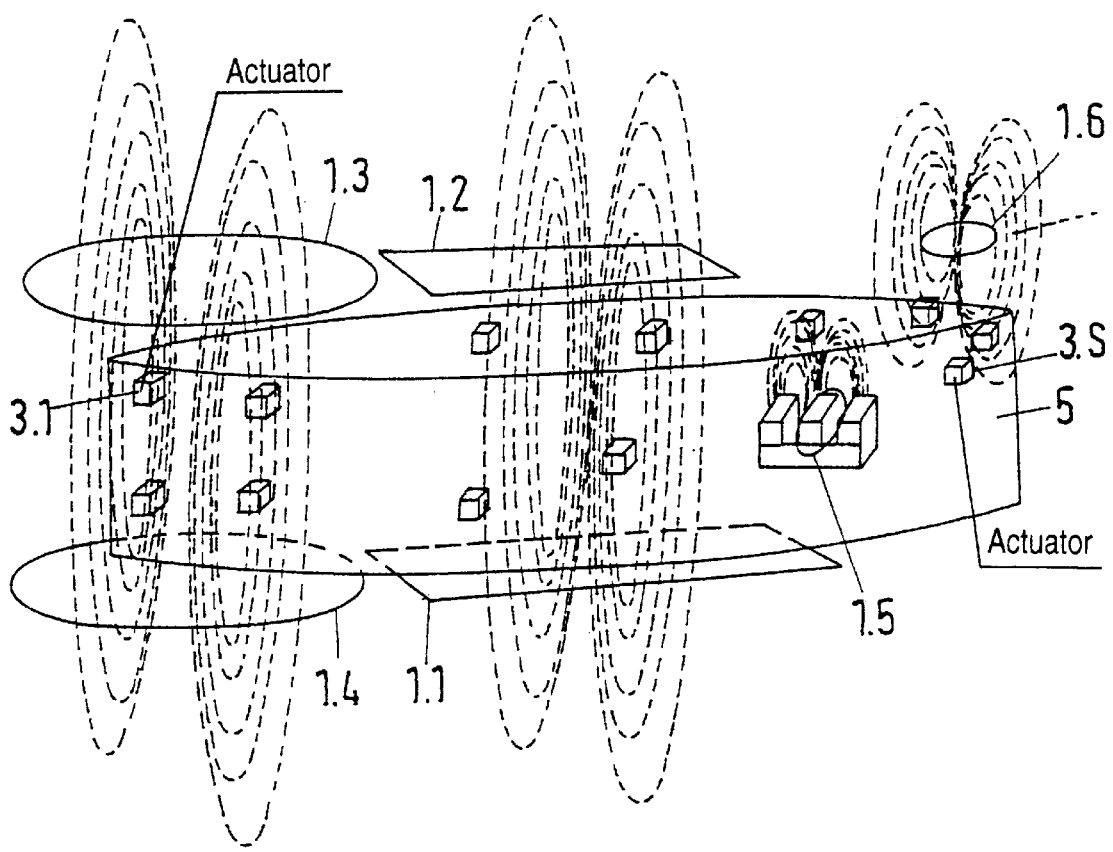

SYSTEM FOR WIRELESSLY SUPPLYING A LARGE NUMBER OF ACTUATORS OF A MACHINE WITH ELECTRICAL POWER

CROSS-REFERENCE TO RELATED APPLICATION

This application is a continuation of copending International Application No. PCT/EP00/05138, filed Jun. 6, 2000, which designated the United States.

BACKGROUND OF THE INVENTION

Field of the Invention

The invention relates to a method and a configuration for supplying a large number of actuators with electrical power without the use of wires, to an actuator and a primary winding for this purpose, and to a system for a machine having a large number of actuators. The invention may be used, for example, for supplying electrical power to micromechanical, piezoelectric, electrochemical, magnetostrictive, electrostricktive, electrostatic or electromagnetic actuators, such as those that are used in actuator systems or machines, for example, in open-loop/closed-loop control systems, in remote control systems, in robot technology, in automatic production machines and automated production machines, as display elements, and in protection and safety systems (for example in outdoor or indoor switchgear assemblies).

A method and a configuration for supplying an electrical load with an electrical supply voltage or with an electrical supply current is known from Published German Patent Application DE 44 42 677 A1, in which radio waves are transmitted from a radio transmitter to a radio receiver that is electrically connected to the load, and are converted by the radio receiver to the electrical supply voltage or the electrical supply current, respectively. The radio waves may be in the electromagnetic radio-frequency range (radio waves) or in the microwave range (radio link).

A disadvantageous factor in this case is that the high frequencies and correspondingly small antennas, and the maximum permissible transmission power, which is restricted by EMC (Electromagnetic Compatibility) regulations and rules for health and safety at work when exposed to electrical, magnetic or electromagnetic fields, mean that only very inadequately short distances can be achieved between the radio transmitter and the radio receiver. The same applies to the achievable power levels, which are in the region of a few microwatts, which is generally inadequate for actuators.

SUMMARY OF THE INVENTION

It is accordingly an object of the invention to provide a system for supplying a large number of actuators with electrical power, which overcomes the above-mentioned disadvantages of the prior art apparatus of this general type.

In particular, it is an object of the invention to provide a cost-effective and reliable way to supply electrical power to a large number of actuators without using wires. Furthermore, a cost-effective and reliable configuration is intended to be specified for carrying out this method. In addition, an actuator which is suitable for this purpose is intended to be proposed. Furthermore a primary winding which is suitable for this purpose is intended to be proposed.

With the foregoing and other objects in view there is provided, in accordance with the invention, a system for a machine having a large number of actuators. The system includes: a machine having a large number of actuators; a medium-frequency oscillator; a process computer for the machine; a central transmission device for transmitting radio signals, the transmission device connected to the process computer; and at least one primary winding for producing a medium-frequency magnetic field for supplying the actuators with electrical power without using wires. The primary winding is fed from the medium-frequency oscillator. Each one of the actuators has a plurality of orthogonal secondary windings that are suitable for drawing power from the medium-frequency magnetic field. Each one of the actuators is equipped with a receiving device for receiving the radio signals from the central transmission device.

In accordance with an added feature of the invention, there is only a single primary winding that globally surrounds the secondary windings of the actuators.

In accordance with an additional feature of the invention, there are at least two primary windings that are configured parallel to each another and between the secondary windings of the actuators.

In accordance with another feature of the invention, two primary windings are configured at right angles to one another.

In accordance with a further feature of the invention, there are three primary windings that are configured at right angles to one another.

In accordance with a further added feature of the invention, the primary winding locally influences at least one of the secondary windings of one of the actuators.

In accordance with a further additional feature of the invention, the primary winding is formed as a two lines; and the secondary windings of the actuators are configured between the double lines.

In accordance with yet an added feature of the invention, the primary winding is provided with a ferrite core.

In accordance with yet an additional feature of the invention, a compensation capacitor is connected to the primary winding.

In accordance with yet another feature of the invention, a central receiving device is connected to the process computer. The actuators are provided with transmission devices for emitting radio signals, containing actuator information, to the central receiving device so that bi-directional information interchange is possible between the process computer and the actuators.

In accordance with yet a further feature of the invention, a compensation capacitor is connected to the secondary windings of one of the actuators.

In accordance with yet a further added feature of the invention, an energy storage device is provided; and an AC/DC controller is provided for charging the energy storage device. The secondary windings of one of the actuators is connected to the AC/DC controller.

In accordance with yet another feature of the invention, the machine is an automated production machine.

With regard to the method according to the invention, this object is achieved by a method for supplying a large number of actuators with electrical power without the use of wires, with a medium-frequency magnetic field which is emitted from at least one primary winding being transmitted to each actuator which has at least one secondary winding, where it is converted into electrical power.

The medium-frequency oscillations that are of interest in this context are intended to mean the range from about 15 kHz to about 15 MHz.

With regard to the inventive apparatus, the object of the invention is achieved by a configuration for supplying a large number of actuators with electrical power without using wires. The configuration includes at least one primary winding which is fed from a medium-frequency oscillator, with each actuator having at least one secondary winding that is suitable for drawing power from a medium-frequency magnetic field.

With regard to the actuator, the object is achieved by an actuator having a number of orthogonal secondary windings that are suitable for drawing power from a medium-frequency magnetic field.

With regard to the primary winding, the object of the invention is achieved by providing a primary winding that includes a number of separate winding sections that are each formed from a number of parallel conductors. The individual winding sections are mechanically and electrically connected to one another via connecting elements. Two winding sections are electrically connected to one another, in an offset manner with respect to one another, when there is one connecting element, thus resulting in two free winding ends that are suitable for the connection of connecting lines to a generator or oscillator.

Alternatively, with regard to the primary winding, the object is achieved by a primary winding consisting of a flexible cable formed from a number of parallel conductors. A connecting element electrically and mechanically connects the two cable ends to one another, in an offset manner with respect to one another, thus resulting in two free winding ends which are suitable for the connection of connecting lines to a generator or oscillator.

With regard to the system, the object is achieved by providing a system for a machine having a large number of actuators, in particular an automated production machine, in which each actuator has at least one secondary winding that is suitable for drawing power from a medium-frequency magnetic field. The system includes at least one primary winding that is fed from a medium-frequency oscillator. The primary winding is provided for supplying the actuators with electrical power without using wires. Each actuator is equipped with a receiving device that receives radio signals from a central transmission device that is connected to a process computer for the machine.

The advantages that an be achieved by the invention are, in particular, in comparison to conventional solutions with a cable connection for supplying the actuators with electrical power, that there is no need for the relatively high cost factor involved with a cable connection for planning, material, installation, documentation and maintenance. No failures can occur as a result of cable breaks or poor for example corroded, contacts.

In comparison to using batteries for supplying power to the actuators, there is no maintenance penalty or cost penalty resulting from the necessity to replace batteries—often at points where access is difficult.

In the stated medium-frequency range from about 15 kHz to about 15 MHz, the disadvantages that result from skin effects, for example, the losses that occur are still manageable. Since the primary windings are too small, in comparison to the wavelengths that occur, to act as antennas, electromagnetic waves are not emitted, thus allowing the configurations to be of simple construction. There is no need for EMC (Electromagnetic Compatibility) measurement of radiated interference. Another advantageous factor is that medium-frequency magnetic fields are shielded only to a minor extent by metallic machine components, so that a magnetic field that is sufficiently strong to supply power advantageously also occurs at inaccessible points in an actuator system or machine.

Other features which are considered as characteristic for the invention are set forth in the appended claims.

Although the invention is illustrated and described herein as embodied in a method and configuration for supplying a large number of actuators with electrical power without the use of wires, and actuator and a primary winding for this purpose, as well as a system for machine having a large number of actuators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows an outline circuit diagram of the configuration for supplying electricity to actuators without using wires;

FIG. 2 shows a circuit diagram to explain the transformer principle used;

FIG. 5 shows a third embodiment with orthogonal primary windings;

FIG. 6 shows a fourth embodiment with primary windings of different shapes;

DESCRIPTION OF THE PREFERRED EMBODIMENT

Figure 3:
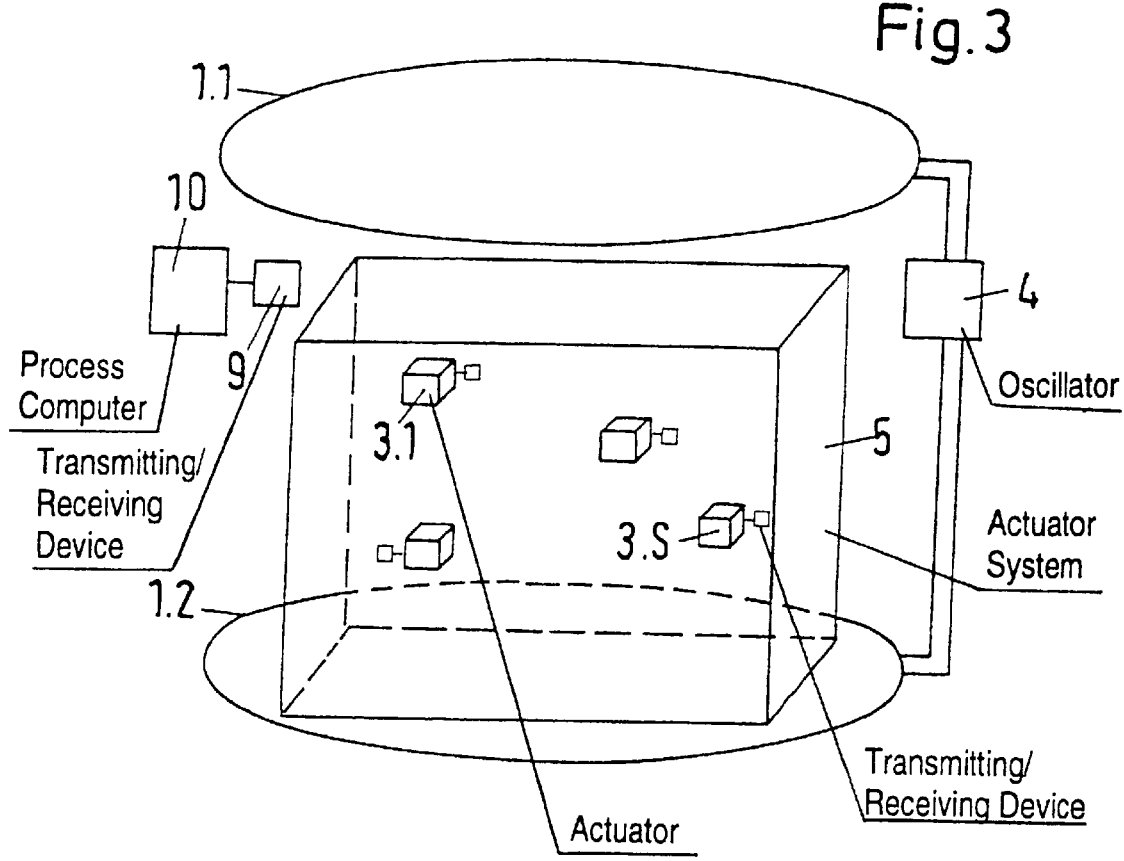
FIG. 3 shows a first practical embodiment.

Referring now to the figures of the drawing in detail and first, particularly, to FIG. 1 thereof, there is shown an outline circuit diagram of the configuration for supplying electricity to actuators without using wires. A circular primary winding 1 can be seen, which is preferably formed from a number of turns and has a large number—possibly up to several hundred—of secondary windings 2.1, 2.2, 2.3 . . . 2.s (s=any desired integer). Each secondary winding 2.1, 2.2., 2.3 . . . 2.s, respectively, is connected to a respective actuator 3.1, 3.2, 3.3 . . . 3.s. The primary winding 1 is connected to an oscillator 4 (medium-frequency oscillator). The oscillator 4 feeds the primary winding 1 with a medium-frequency oscillation signal in the range from about 15 kHz to about 15 MHz. This medium frequency would lead to radiation of electromagnetic fields whose wavelengths are greater than 22 m to 22 km and are thus considerably greater than the dimensions of the primary winding that is used—less than 2 m—so that the primary winding does not act as an antenna for such electromagnetic radiation. The coupling between the primary winding and the secondary windings is thus purely magnetic (and without any effective electromagnetic coupling), in the sense of a medium-frequency transformer.

Examples of possible actuators are micromechanical, piezoelectric, electrochemical, magnetostrictive, electrostrictive, electrostatic or electromagnetic actuators.

FIG. 2 shows a circuit diagram to explain the transformer principle used. Once again, a primary winding 1 can be seen, with the feeding oscillator 4 and the actuators 3.1 . . . 3.s, together with the connected secondary windings 2.1 . . . 2.s.

FIG. 3 shows a first practical embodiment. It shows an actuator system 5—in particular a machine, an industrial robot, an automatic production machine or an automated production machine—which is provided with numerous actuators 3.1 . . . 3.s that are mounted on different, at least partially moving, system components. The actuators 3.1 . . . 3.s are used, for example, as display elements, as open-loop/closed-loop control elements, and as protection/safety elements.

The actuator system 5 is located between two horizontally arranged primary windings 1.1 and 1.2.

These primary windings 1.1, 1.2 are connected electrically in parallel to the oscillator 4 (generator), or alternatively, are fed from two separate oscillators. A relatively uniform magnetic field is formed between the two primary windings. The important factor in this case is that the actuators are always located in the magnetic field that is formed between two primary windings 1.1, 1.2, so that a magnetic coupling is produced via their secondary windings, and in consequence, they can be fed with power.

Each actuator 3.1 . . . 3.s is equipped with a receiving device and a transmission device which receives radio signals relating to commands to the actuators to carry out specific actions, and emits radio signals relating to up-to-date actuator information, such as the "desired action successfully/unsuccessfully carried out" acknowledgements. The radio signals to all of the actuators and from all the actuators are respectively emitted and received by a central transmitting/receiving device 9 and are respectively predetermined by or past on to a process computer 10 (programmable logic controller). The transmitting/receiving device is preferably located in the immediate vicinity of the actuator system 5, in order to ensure an optimum radio connection to the actuators, while the process computer 10 that controls the machine may also be arranged remotely from the actuator system 5. As can easily be seen, the proposed system results in an actuator configuration that does not have any cables either to supply the actuators 3.1 . . . 3.s with electrical power or to transmit information to and from the process computer 10.

Figure 4:
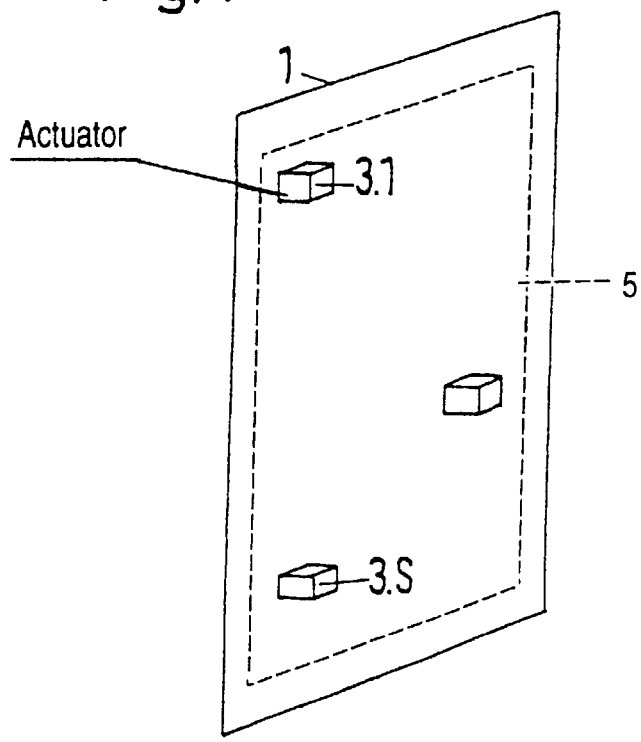
FIG. 4 shows a second practical embodiment.

FIG. 4 shows a second practical embodiment. Only a single primary winding 1 is provided in this embodiment. The primary winding 1 globally surrounds the actuator system 5—in particular an industrial robot, automatic production machine, or automated production machine—with the numerous actuators 3.1 . . . 3.s mounted on it.

FIG. 5 shows a third embodiment with three primary windings arranged at right angles to one another. An actuator system 5 is shown, which is surrounded by a first vertical primary winding 1.1, a second vertical primary winding 1.2 at right angles to it, and a horizontal third primary winding 1.3. This embodiment, with three orthogonal primary windings, produces a particularly uniform, non-directional magnetic field. Alternatively or in addition to this, it is also possible to equip each actuator with two or three orthogonal secondary windings.

Furthermore, an embodiment is also feasible in which only two orthogonal primary windings are provided. Embodiments are, of course, also feasible which have a number of primary windings 1.1 to 1.p which are not arranged at right angles.

FIG. 6 shows a fourth embodiment with a number of primary windings of different shapes. This is a physically relatively extended actuator system 5, in which the individual actuators 3.1 . . . 3.s are not arranged distributed relatively homogeneously over the system, but appear in groups in a number of specific areas of the system. In a physically extended configuration such as this, it is advantageous, for reasons relating to the magnetic field strength that can be achieved, to use a number of specifically arranged primary windings, which each locally influence at least one secondary winding of one actuator.

A first system area, which is fitted with actuators, is in this case located in the magnetic field between two horizontal, rectangular, mutually opposite primary windings 1.1, 1.2. A second system area that is fitted with actuators and that is adjacent to the former is located in the magnetic field between two horizontal, circular or oval, mutually opposite primary windings, 1.3, 1.4.

A third system area which is fitted with actuators is influenced by the magnetic field from a primary winding 1.5. This primary winding is arranged around the center limb of an E-shaped ferrite core, this partially shielding the magnetic field and partially reinforcing it in the locally limited area of interest (spot effect). A fourth system area which is fitted with actuators is located in the area of influence of a primary winding 1.6. The magnetic fields from the individual primary windings 1.1 to 1.6 are each indicated by dashed lines in the individual system areas.

Figure 7:
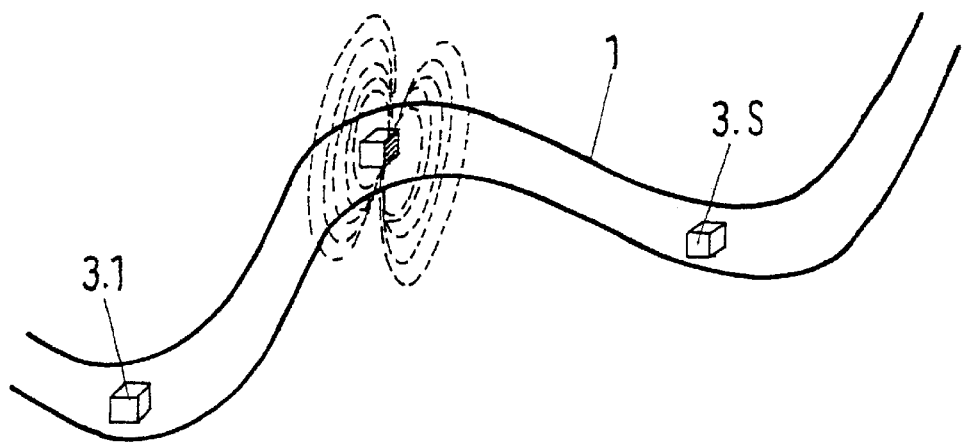
FIG. 7 shows a fifth embodiment with a primary winding in the form of a strip.

FIG. 7 shows a fifth embodiment with a primary winding in the form of a strip. The primary winding 1 in the form of a strip has one end connected to the oscillator 4, while the other end is interconnected. This results in a double line with two conductors through which current flows in opposite directions, which reinforces the magnetic field in the desired manner between the two conductors, and attenuates the magnetic field in the area outside the two conductors. The primary winding 1 in the form of a strip is advantageously installed on the machine in such a manner that the individual actuators 3.1 to 3.n are located in the area between the two conductors of the double line.

In this case, each line of the double line may of course be composed of a number of individual conductors, with the individual conductors in the two lines being connected to one another in the sense of a winding, thus effectively forming a primary winding 1, as described with reference to FIG. 4, which is extremely flat.

Figure 8:
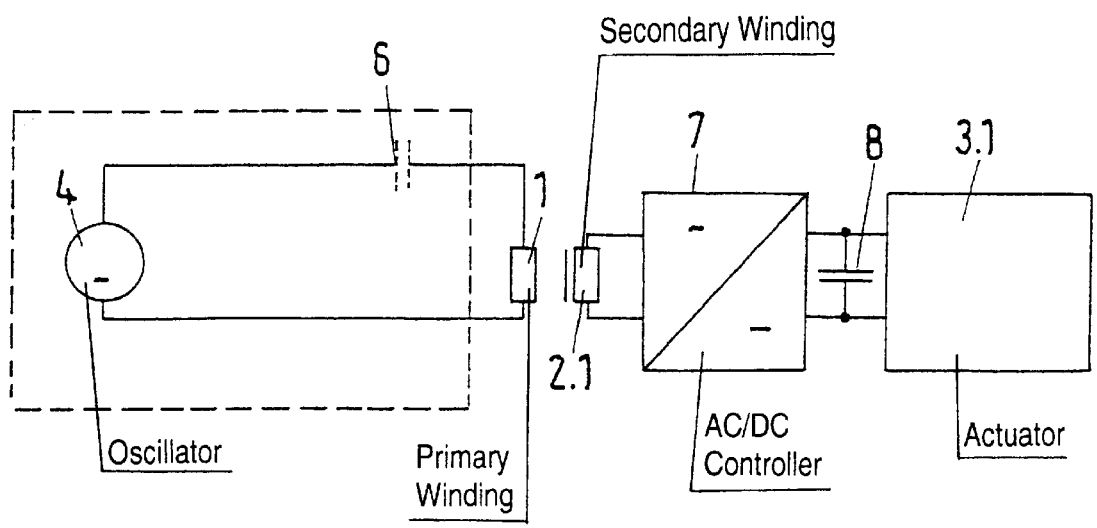
FIG. 8 shows an equivalent circuit with developments on the primary side and secondary side.

FIG. 8 shows an equivalent circuit with developments on the primary side and secondary side. As can be seen, the primary winding 1 is connected via a compensation capacitor 6 to the oscillator 4, so that the oscillator operates at resonance. The magnetic coupling between the primary winding 1 and the secondary winding 2.1 is indicated only by way of example. An AC/DC controller 7 is connected to the secondary winding 2.1, and feeds an energy storage device 8 that is used for supplying power to the actuator 3.1.

As an extension to the circuit diagram illustrated in FIG. 8, it is also possible to provide a compensation capacitor in the connecting line between the secondary winding 2.1 and the AC/DC controller 7.

Windings are normally produced by winding a conductor in a number of turns to produce the desired number of turns. This can result in difficulties in winding with a large area, for example when a relatively large primary winding is subsequently being integrated in an automatic or automated production machine, or, in general, in any machine. The expression "relatively large" means that the primary winding is approximately the same size as the automatic production machine itself.

Sixth, seventh and eighth embodiments of the primary windings are described in the following text, which can be integrated, even retrospectively, in a system or machine without any difficulties.

In this case, the primary winding may include a number of separate winding sections that are each formed from a number of parallel conductors. The individual winding sections are mechanically and electrically connected to one another via connecting elements. Two winding sections are electrically connected to one another, in an offset manner with respect to one another, when there is one connecting element, thus resulting in two free winding ends that are suitable for the connection of connecting conductors to an oscillator or generator.

As an alternative to this, the primary winding may include a flexible cable, formed from a number of parallel conductors, and a connecting element which electrically and mechanically connects the two cable ends to one another, in an offset manner with respect to one another, thus resulting in two free winding ends which are suitable for the connection of connecting conductors to an oscillator or generator.

The advantages that can be achieved by the sixth, seventh and eighth embodiments are, in particular, that the primary winding can be disconnected, so that it is simple to install the proposed primary winding in a machine retrospectively. The primary winding is produced only in the machine itself by using the at least one connecting element for connecting the individual winding sections or the flexible cable, thus allowing exact matching to the machine by means of the number and position of the connecting elements and by the flexible configuration of the winding sections, which are preferably composed of flexible, flat ribbon cable. The use of flat ribbon cable has the further advantage that the magnetic field produced by the primary winding is relatively broad axially, thus improving the magnetic coupling to further windings.

Figure 9:
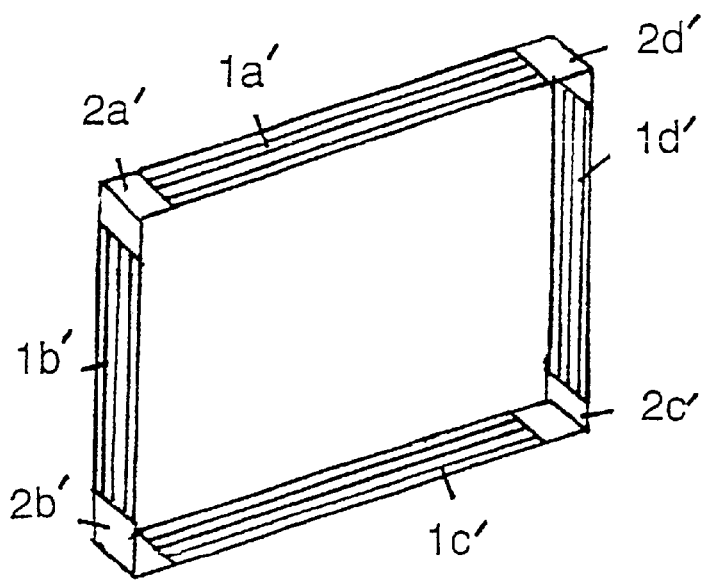
FIG. 9 shows a sixth embodiment of a primary winding.

FIG. 9 shows a sixth embodiment of a primary winding. This sixth embodiment is particularly suitable for a vertical configuration of the primary winding. The rectangular primary winding has four separate winding sections 1a', 1b', 1c', 1d', which are electrically and mechanically connected to one another at the four corners via connecting elements 2a', 2b', 2c', 2d'. Flexible multi-core flat ribbon cable with a number of parallel conductors is preferably used for the winding sections 1a' to 1d'.

Figure 10:
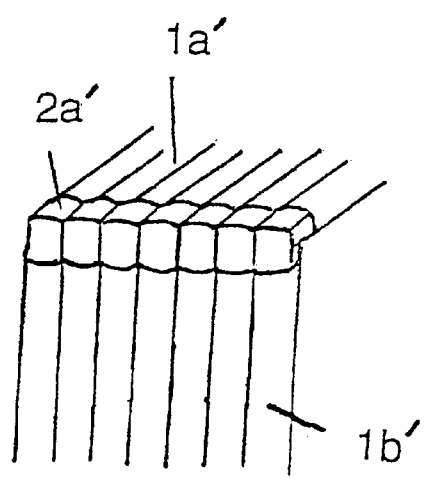
FIG. 10 shows a detailed view of one corner of a sixth embodiment of a primary winding.

FIG. 10 shows a detailed view of one corner of the sixth embodiment of the primary winding. The illustrated connecting element 2a' has seven contact points, which are angled, are arranged alongside one another in a row, are electrically isolated from one another, and each have two connections for the two windings sections 1a', 1b'. The angles at the contact points that are arranged alongside one another lie in two planes. In order to make electrical contact, these contact points have, for example, openings with contact tongues, into which the electrical conductors of the winding sections are inserted.

Figure 11:
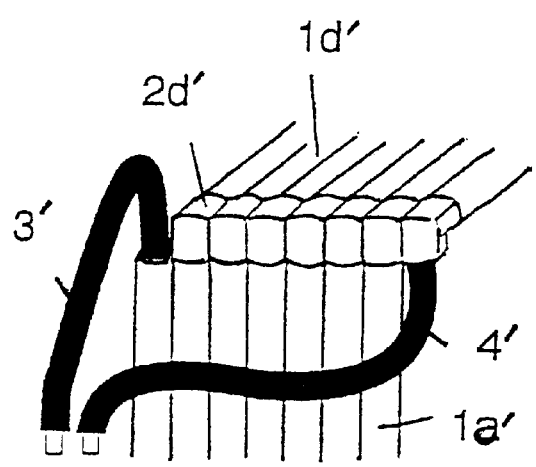
FIG. 11 shows a detailed view of the winding feed in the sixth embodiment.

FIG. 11 shows a detailed view of the winding feed in the sixth embodiment. As can be seen, the two winding sections 1a', 1d' are inserted into the connecting element 2d', in an offset manner with respect to one another. The respective free ends of the winding section 1a' and of the winding section 1d' form the winding ends and make contact with the respective connecting line 3' or 4', with these connecting lines being connected to a generator or oscillator at the other end. The connecting element 2d' is used for making contact between the connecting line 4' and a winding section 1d'. The further electrical connection between the connecting line 3' and the winding section 1a' is produced, for example, by soldering.

Alternatively, a connecting element can also be used at the winding feedpoint which has one more contact point than the number of parallel conductors in a winding section. Both the contacts between the connecting lines 3', 4' and the winding sections can then be made via the connecting element itself.

The further connecting elements 2b', 2c' of the primary winding are connected to the winding sections in the manner illustrated in FIG. 10. Overall, this results in a primary winding with seven turns.

Figure 12:
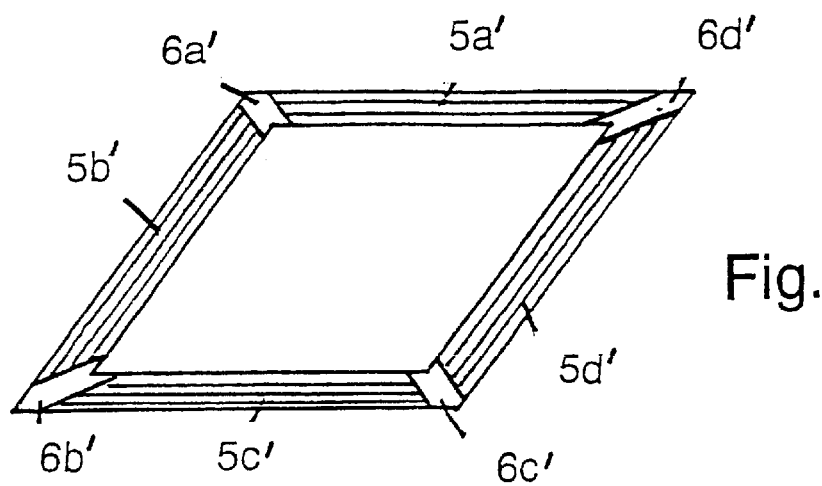
FIG. 12 shows a seventh embodiment of primary winding.

FIG. 12 shows a seventh embodiment of a primary winding. This seventh embodiment is particularly suitable for a horizontal configuration of the primary winding. The rectangular primary winding has four separate winding sections 5a', 5b', 5c', 5d', which are electrically and mechanically connected to one another at the four corners via connecting elements 6a', 6b', 6c', 6d'. Multi-core flat ribbon cable is preferably used for the winding sections 5a' to 5d'.

Figures 13, 14:
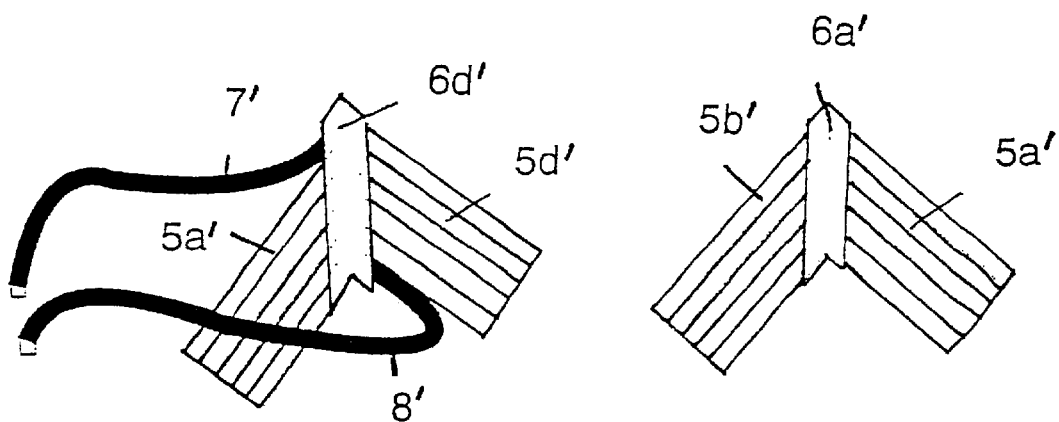
FIG. 13 shows a detailed view of the winding feed in the seventh embodiment.
FIG. 14 shows a detailed view of one corner of the seventh embodiment of a primary winding.

FIG. 13 shows a detailed view of the winding feed in the seventh embodiment. In order to make electrical contact, the connecting elements once again have openings with contact tongues, into which the electrical conductors of the winding sections are inserted. As can be seen, the two winding sections 5a', 5d' are inserted into the connecting element 6d' in an offset manner with respect to one another. The respective fee ends of the winding section 5a' and of the winding sections 5d' form the winding ends and make contact with the respective connecting line 8' or 7'. The other ends of these connecting lines are connected to a generator or oscillator. Since a connecting element 6d' is used which has one more contact pair than the number of parallel conductors in the winding sections, the connecting element 6d' is used to make contact between the connecting line 7' and the winding section 5d', and to make contact between the connecting line 8' and the winding section 5a'.

FIG. 14 shows a detailed view of one corner of a seventh embodiment of the primary winding. The illustrated connecting element 6a' has five contact points, which are angled, are arranged in a row alongside one another, and are electrically isolated from one another. The contact points are for the two winding sections 5a', 5b', and the angles of the contact points are arranged alongside one another lying in one plane. The further winding sections are electrically and mechanically connected via the connecting elements 6b' and 6c' in the same manner.

It has been stated above that multi-core, flexible flat ribbon cable is preferably used for the winding sections 1a' to 1d' and 5a' to 5d'. As an alternative to this, and in particular in order to form a very high-power primary winding carrying a relatively high current, it is possible to form the winding sections from a number of rigid conductor bars, which can be arranged alongside one another and must be electrically isolated from one another.

Rectangular configurations of the primary windings have been described above, and these require the use of connecting elements with contact points bent at right angles. As an alternative to this, it is, of course, also possible to use other winding configurations (triangular, pentagonal, etc.).

Figure 15:
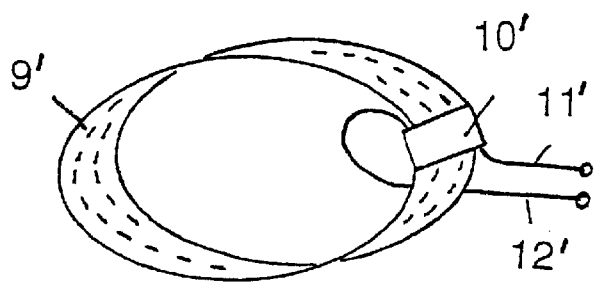
FIG. 15 shows an eighth embodiment of a primary winding.

In the simplest case, a primary winding including a flexible cable 9', in particular a flat ribbon cable and a single connecting element 10', can be produced. The two ends of the cable are electrically connected to one another in an offset manner with respect to one another, via the only connecting element 10', thus resulting in free winding ends which are suitable for the connection of connecting lines 11', 12' to a generator or oscillator. A primary winding such as this is shown in FIG. 15.

We claim:

1. A system for a machine having a large number of actuators, comprising:
   a machine having a large number of actuators;
   a medium-frequency oscillator;
   a process computer for said machine;
   a central transmission device for transmitting radio signals, said transmission device connected to said process computer; and
   at least one primary winding for producing a medium-frequency magnetic field for applying said actuators with electrical power without using wires, said primary winding being fed from said medium-frequency oscillator;
   each one of said actuators having a plurality of mutually orthogonal secondary windings suitable for drawing power from the medium-frequency magnetic field; and
   each one of said actuators being equipped with a receiving device independent of said secondary windings for receiving the radio signals from said central transmission device.

2. The system according to claim 1, wherein said at least one winding defines only a single primary winding that globally surrounds said secondary windings of said actuators.

3. The system according to claim 1, wherein said at least one primary winding defines at least two primary windings that are configured parallel to each another and between said secondary windings of said actuators.

4. The system according to claim 1, wherein said at least one primary winding defines two primary windings that are configured at right angles to one another.

5. The system according to claim 1, wherein said at least one primary winding defines three primary windings that are configured at right angles to one another.

6. The system according to claim 1, wherein said primary winding locally influences at least one of said secondary windings of one of said actuators.

7. The system according to claim 1, wherein:
   said primary winding is formed as a two lines; and
   said secondary windings of said actuators are configured between said double lines.

8. The system according to claim 1, wherein said primary winding is provided with a ferrite core.

9. The system according to claim 1, comprising a compensation capacitor connected to said primary winding.

10. The system according to claim 1, comprising:
    a central receiving device connected to said process computer;
    said actuators being provided with transmission devices for emitting radio signals, containing actuator information, to said central receiving device; and
    bi-directional information interchange being possible between said process computer and said actuators.

11. The system according to claim 1, comprising a compensation capacitor connected to said secondary windings of one of said actuators.

12. The system according to claim 1, comprising:
    an energy storage device; and
    an AC/DC controller for charging said energy storage device;
    said secondary windings of one of said actuators being connected to said AC/DC controller.

13. The system according to claim 1, wherein said machine is an automated production machine.

14. A system for a machine, comprising:
    a medium-frequency oscillator and at least one primary winding connected to said oscillator for generating a medium-frequency magnetic field;
    a process computer for said machine and a central transmission device connected to said process computer for transmitting radio signals;
    a plurality of actuators movably disposed in the medium-frequency magnetic field;
    each of said actuator having a plurality of orthogonal secondary windings for wirelessly drawing electrical power from the medium-frequency magnetic field; and
    each of said actuator being equipped with a receiving device for receiving the radio signals from said central transmission device.

15. The system according to claim 14, wherein said at least one primary winding is a single primary winding globally surrounding said secondary windings of said actuators.

16. The system according to claim 14, wherein said at least one primary winding is one of at least two mutually parallel primary windings, an said secondary windings of said actuators are dispose between said primary windings.

17. The system according to claim 14, wherein said at least one primary winding is one of at least two mutually orthogonal primary windings.

18. The system according to claim 14, wherein said at least one primary winding is one of at least three mutually orthogonal primary windings.

19. The system according to claim 14, which further comprises a central receiving device connected to said process computer, wherein said actuator are provided with transmission devices for emitting radio signals, containing actuator information, to said central receiving device, whereby bi-directional information interchange is enabled between said process computer and said actuators.

20. The system according to claim 14, wherein said actuators are units in an automated production machine.

21. A system for a machine, comprising:
    a medium-frequency oscillator and at least one primary winding connected to said oscillator for generating a medium-frequency magnetic field;
    a process computer for aid machine and a central communication device connected to said process computer for one of transmitting and receiving radio signals in a frequency range different from the medium-frequency magnetic field;

a plurality of actuators movably disposed in the medium-frequency magnetic field with at least two degrees of freedom;

each of said actuators having at least one secondary winding for wirelessly drawing electrical power from the medium-frequency magnetic field; and each of said actuators being equipped with a communication device for communicating with said central communication device through the radio signals.

22. The system according to claim 21, wherein said at least one primary winding is one of at least two mutually orthogonal primary windings.

23. The system according to claim 21, wherein said actuators are movably disposed about three degrees of freedom.

* * * * *